(12) United States Patent
Griffin et al.

(10) Patent No.: US 8,239,948 B1
(45) Date of Patent: Aug. 7, 2012

(54) SELECTING MALWARE SIGNATURES TO REDUCE FALSE-POSITIVE DETECTIONS

(75) Inventors: Kent E. Griffin, Santa Monica, CA (US); Tzi-cker Chiueh, Los Angeles, CA (US); Scott Schneider, Santa Monica, CA (US); Xin Hu, Ann Arbor, MI (US)

(73) Assignee: Symantec Corporation, Mountain View, CA (US)

( * ) Notice: Subject to any disclaimer, the term of this patent is extended or adjusted under 35 U.S.C. 154(b) by 757 days.

(21) Appl. No.: 12/340,420

(22) Filed: Dec. 19, 2008

(51) Int. Cl.
*G06F 11/00* (2006.01)
(52) U.S. Cl. .............................. 726/24; 726/22; 707/200
(58) Field of Classification Search .................... 726/24, 726/22; 707/200
See application file for complete search history.

(56) References Cited

U.S. PATENT DOCUMENTS

| | | | |
|---|---|---|---|
| 7,950,059 B2 * | 5/2011 | Aharon et al. .................. | 726/24 |
| 2006/0161986 A1 * | 7/2006 | Singh et al. ...................... | 726/24 |
| 2007/0038677 A1 * | 2/2007 | Reasor et al. ................... | 707/200 |
| 2007/0192863 A1 * | 8/2007 | Kapoor et al. .................. | 726/23 |
| 2009/0320133 A1 * | 12/2009 | Viljoen et al. .................. | 726/24 |
| 2009/0328221 A1 * | 12/2009 | Blumfield et al. .............. | 726/24 |
| 2010/0150006 A1 * | 6/2010 | Pourzandi et al. ............ | 370/252 |

OTHER PUBLICATIONS

Davis, D., "How Can Cisco Automatic Signature Extraction Prevent Zero-Day Virus Attacks?" Aug. 15, 2008, TechRepublic, 5 pages, [Online] [Retrieved on Mar. 12, 2010] Retrieved from the Internet<URL:http://blogs.techrepublic.com.com/networking/?p=628>.
Deng, P.S. et al., "Intelligent Automatic Malicious Code Signatures Extraction," IEEE, 2003, pp. 600-603, [Online] [Retrieved on Mar. 16, 2010] Retrieved from the Internet<URL:http://ieeexplore.ieee.org/iel5/9088/28847/01297626.pdf?isnumber=288 47=CNF&amumber=1297626&arSt=+600&ared=+603&arAuthor=Peter+Shaohua+Deng%3B+Jau-Hwang+Wang%3B+Wen-Gong+Shieh%3B+Chin-Pin+Yen%3B+Cheng-Tan+Tung>.
"Faulty NOD32 Virus Signature Triggers Alarm When Visiting Web," Jul. 2, 2007, The H Security, 5 pages, [Online] [Retrieved on Mar. 12, 2010] Retrieved from the Internet<URL:http://www.heise-online.co.uk/security/Faulty-NOD32-virus-signature-triggers-alarm-when-visiting-web--/news/92032>.
Kephart, J.O. et al., "Automatic Extraction of Computer Virus Signatures," [Online] [Retrieved on Mar. 12, 2010] Retrieved from the Internet<URL:http://www.research.ibm.com/antivirus/SciPapers/Kephart/VB94/vb94.html>.
Kumar, S. et al., "A Generic Virus Scanner in C++," Sep. 17, 1992, pp. 1-21, [Online] [Retrieved on Mar. 12, 2010] Retrieved from the Internet<URL:https://www.cerias.purdue.edu/assets/pdf/bibtex_archive/92-01.pdf.
Landesman, M., "What is a Virus Signature?" About.com, [Online] [Retrieved on Mar. 12, 2010] Retrieved from the Internet<URL:http://antivirus.about.com/od/whatisavirus/a/virus-signature.htm>.
Stallings, W., "Cryptography and Network Security: Principles and Practice," [Online] [Retrieved on Mar. 12, 2010] Retrieved from the Internet<URL:http://books.google.com/books?id=sEwCT7251RgC&pg=PA611&lpg=PA611&dq=generic+code+virus+signature&source=web&ots=EWvSmv372Q&sig=cnjxF0HZyAaPD9y0AW1gM_Fo6wM&hl=en&sa=X&oi=book_result&resnum=4&ct=result>.

(Continued)

*Primary Examiner* — Haresh N Patel
*Assistant Examiner* — Dao Ho
(74) *Attorney, Agent, or Firm* — Fenwick & West LLP

(57) ABSTRACT

A set of candidate signatures for a malicious software (malware) is generated. The candidate signatures in the set are scored based on features that indicate the signatures are more unique and thus less likely to generically occur non-malicious programs. A malware signature for the malware entity is selected from among the candidate malware signatures based on the scores. The selected malware signature is stored.

20 Claims, 5 Drawing Sheets

OTHER PUBLICATIONS

"What is a Virus Signature? Are They Still Used?" Agustin's Blog, Aug. 10, 2008, 9 pages, [Online] [Retrieved on Mar. 12, 2010] Retrieved from the Internet<URL:http://www.agusblog.com/wordpress/what-is-a-virus-signature-are-they-still-used-3.htm>.

* cited by examiner

SELECTING MALWARE SIGNATURES TO REDUCE FALSE-POSITIVE DETECTIONS

BACKGROUND OF THE INVENTION

1. Field of the Invention

This invention pertains in general to computer security and in particular to the development of signatures to accurately identify malicious software.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can stealthily capture important information such as logins, passwords, bank account identifiers, and credit card numbers. Similarly, the malware can provide hidden interfaces that allow the attacker to access and control the compromised computer.

One method used to detect malware is to identify malware signatures. Malware signatures contain data describing characteristics of known malware and are used to determine whether an entity such as a computer file or a software application contains malware. Typically, a set of malware signatures is generated by a provider of security software and is deployed to security software on a user's computer. This set of malware signatures is then used by the security software to scan the user's computer for malware.

During malware signature generation, malware signatures are typically validated against entities that are known to not contain malware, herein referred to as "goodware," in order to ensure that the malware signatures do not generate false positive identifications of malware. In other words, the malware signatures are validated to ensure they do not falsely identify goodware as malware. Typically, a malware signature is first generated by a security analyst or a computer and then compared to a dataset of goodware in order to determine whether the malware signature generates false positive identifications of malware. Due to the large size of the dataset of all known goodware and the rapidly expanding number of malware files, generating malware signatures for the malware files and comparing these signatures to a dataset of goodware to identify malware signatures that do not result in false positive identifications in malware has become increasingly difficult.

Accordingly, there is a need in the art for ways to generate malware signatures that are unlikely to cause false positive detections.

BRIEF SUMMARY

The above and other needs are met by a computer-implemented method, a computer program product and a computer system for selecting a signature for a malware entity. One embodiment of the computer-implemented method generates a set of candidate signatures for the malware entity. The computer-implemented method scores each candidate signature in the set. The score for a candidate signature indicates a likelihood of whether features present in the candidate signature are found in a set of non-malicious software. The computer-implemented method selects a malware signature for the malware entity from among the candidate signatures in the set based on the scores. The computer-implemented method then stores the selected malware signature.

Embodiments of the computer program product have a computer-readable storage medium storing computer-executable code for selecting a signature for a malware entity. The code comprises a candidate signature determination module configured to generate a set of candidate signatures for the malware entity. The code further comprises a signature scoring module configured to score each candidate signature in the set. The score for a candidate signature indicating a likelihood of whether features present in the candidate signature are found in a set of non-malicious software. The code further comprise a signature selection module configured to select a malware signature for the malware entity from among the candidate signatures in the set based on the scores and store the selected malware signature.

Embodiments of the computer-implemented system comprise a computer processor and a computer-readable storage medium storing computer program modules configured to execute on the computer processor. The computer program modules comprise a candidate signature determination module configured to generate a set of candidate signatures for the malware entity. The computer program modules further comprise a signature scoring module configured to score each candidate signature in the set, the score for a candidate signature indicating a likelihood of whether features present in the candidate signature are found in a set of non-malicious software. Additionally, the computer program modules comprise a signature selection module configured to select a malware signature for the malware entity from among the candidate signatures in the set based on the scores and store the selected malware signature.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
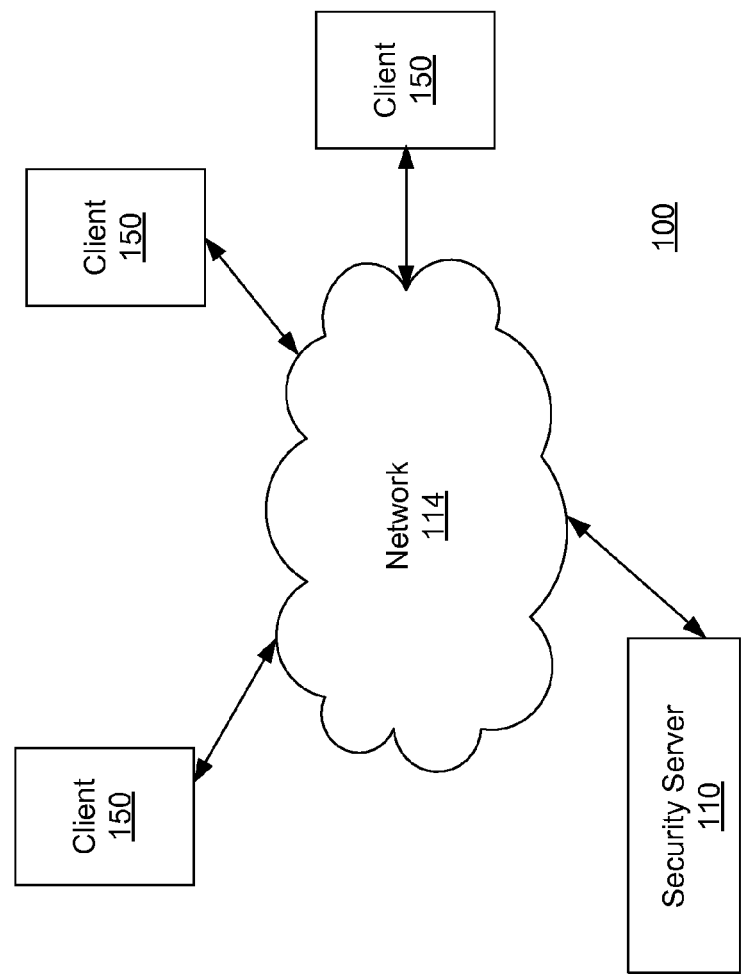
FIG. 1 is a high-level block diagram of a computing environment according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

Generally, the security server 110 generates malware signatures for known malware. A signature is any characteristic such as a pattern, metadata or sequence associated with an entity (e.g., software applications or executable files) that can be used to accurately identify the entity as malware. In the embodiments discussed herein, a malware signature for detecting a particular malware entity contains a sequence of code derived from that entity. In order to generate the malware signature, the security server 110 analyzes the malware to determine multiple candidate malware signatures from the malware itself. In one embodiment, the candidate malware signatures are sequences of code that refer to an ordered set of one or more data elements, such as computer processor instructions, occurring within the malware.

The security server 110 scores the candidate malware signatures associated with the malware in order to select one or more signatures for deployment to the clients 150. In one embodiment, the candidate signatures are scored based on features present in the candidate signatures. The features represent characteristics (of, e.g., computer instructions) that also appear in goodware. The score assigned to a candidate malware signature indicates the likelihood that the features present in the candidate malware signature are also present in goodware, with a higher score indicating that the features are less likely to be present. In other words, the score assigned to a candidate malware signature represents an "interestingness" or "uniqueness" metric that represents a likelihood that the same features are not present in the goodware. By scoring the candidate malware signatures in this manner, it is possible to identify candidate malware signatures that are less likely to generate false positive detections in goodware. In one embodiment, the highest-scoring candidate signature for a piece of malware is selected for use and deployment to clients 150 because it represents the malware signature that is least likely to generate a false-positive detection.

The security server 110 interacts with the clients 150 via the network 114. The security server 110 deploys a set of malware signatures to the clients 150. The clients 150 use the malware signatures in conjunction with security software to identify malware. In one embodiment, the clients 150 execute security software provided by the security server 110 to scan the clients 150 for entities such as software applications or files which correspond to (e.g., have the sequences found in) the malware signatures.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
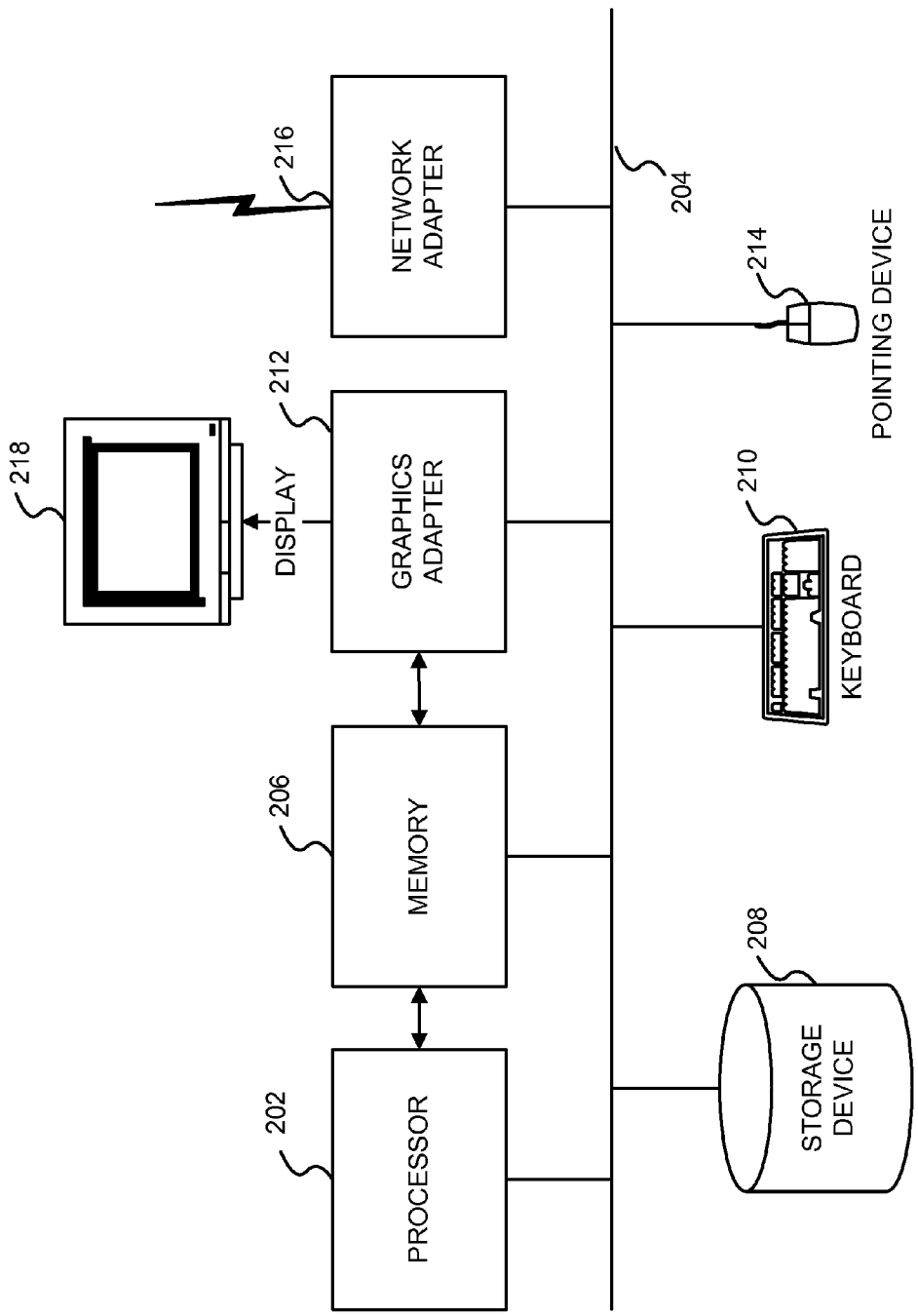
FIG. 2 is a high-level block diagram illustrating a typical computer for use as a security server or a client according to one embodiment.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a computer-readable storage medium such as a hard disk drive but can also be any other device capable of storing data, such as a writeable compact disk (CD) or DVD, or a solid-state memory device. The memory 206 may be any computer-readable storage medium, such as, firmware, read-only memory (ROM), non-volatile random access memory (NVRAM), and/or RAM, and holds computer executable program instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
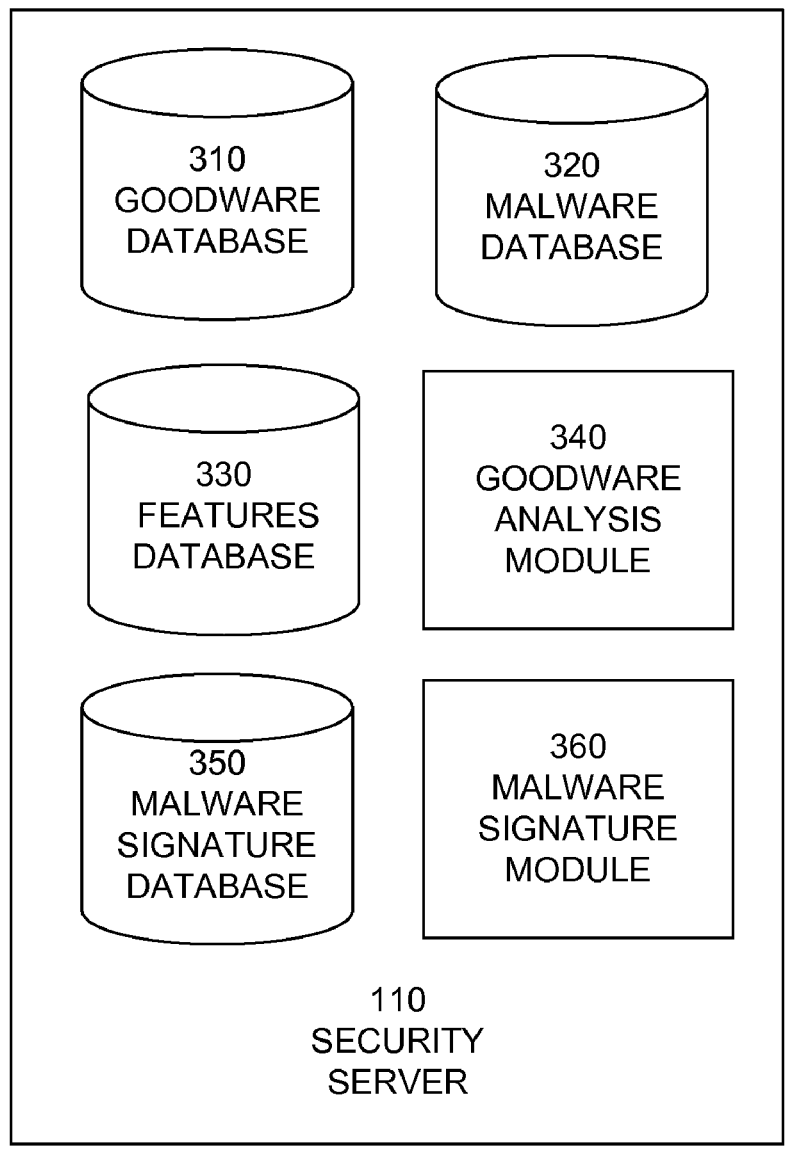
FIG. 3 is a high-level block diagram illustrating a detailed view of a security server according to one embodiment.

FIG. 3 is a high-level block diagram illustrating a detailed view of the security server 110 according to one embodiment. As shown in FIG. 3, the security server 110 includes multiple modules. Those of skill in the art will recognize that other embodiments of the security server 110 can have different and/or other modules than the ones described here, and that the functionalities can be distributed among the modules in a different manner.

The goodware database 310 stores a set of known goodware entities referred to as a goodware dataset. The set of goodware entities can range from one goodware entity to millions of goodware entities. A goodware entity is an entity such as a file or software application that is known not to be malware. The goodware dataset includes executable files of the goodware entities that contain executable code formed of data and computer processor instructions.

The malware database 320 stores a set of known malware entities referred to as a malware dataset. A malware entity is an entity such as a file or software application that exhibits malicious behavior such as a computer virus or computer worm. The set of malware entities can range from one malware entity to millions of malware entities. Similar to the goodware dataset, the malware dataset includes executable files of the malware entities that contain executable code.

In one embodiment, a goodware analysis module 340 analyzes features of the executable code of the goodware in the goodware dataset. According to one embodiment, the goodware analysis module 340 comprises a disassembler, such as the IDA PRO disassembler available from Hex-Rays SA of Liege, Belgium. The goodware analysis module 340 uses the disassembler to disassemble the executable files in the goodware data set in order to translate machine code in the executable files into assembly language sequences. Disassembling the goodware in this manner exposes certain features that are analyzed by the goodware analysis module 340.

In one embodiment, a feature analyzed by the goodware analysis module 340 is the commonality of immediate operand values. An immediate operand is an operand that is directly encoded as part of a machine instruction. The goodware analysis module 340 analyzes immediate operands occurring in the disassembled goodware and determines the frequency at which given values of immediate operands occur. Certain immediate operand values, such as all ones or all zeros, are likely to occur frequently, while other operand values are likely to occur less frequently. Thus, a high frequency of occurrence of an immediate operand value in the goodware dataset suggests that the value is a common. In contrast, a low frequency of occurrence of a value in the goodware dataset suggests that the value is unusual. The threshold for determining what frequency constitutes a high or low frequency of occurrence can be set by a security analyst.

In one embodiment, the goodware analysis module 340 determines whether an immediate operand value is unusual or "interesting" based on the context in which the value is used within the goodware. For example, if an immediate operand value contains a relative or absolute address that is subject to relocation or change depending on the location of where the executable is loaded in memory, the goodware analysis module 340 determines that the immediate operand value is less interesting or common since application programs frequently access data and code addresses within their own address space.

Another feature analyzed by the goodware analysis module 340 is the address offsets used in [base+offset] addressing by the goodware stored in the goodware database 310. In one embodiment, the goodware analysis module 340 determines these addresses by disassembling goodware. The goodware analysis module 340 specifically examines the size of the offsets to determine the frequency of occurrence of offsets of various sizes. By observing the address offsets used in [base+offset] addressing by the goodware, the goodware analysis module 340 can determine the typical (e.g., average) size of offsets and determine which offset sizes are "large." Offsets of larger than average size typically indicate that the goodware is indexing into a large data structure. Such large data structures are often unique to individual goodware entities. Thus, the presence of a large address offset is unusual and "interesting."

Embodiments of the goodware analysis module 340 can analyze other features of the goodware in addition to, or instead of, the features described above.

The features database 330 stores data describing features that are "interesting" in the sense that the features can be used to determine whether a feature found in malware is likely to also be present in goodware. In one embodiment, the features database 330 stores data derived from the goodware by the goodware analysis module 340. These data include data describing the relative frequency of immediate operand values, and data indicating whether given address offsets are considered "large."

The features database 330 can also store data from sources other than the goodware analysis module 340. For example, the features database 330 can include a list of math and logic instructions that are "interesting" because such instructions occur infrequently in the goodware or because sequences containing the instructions are likely to be uncommon. In one embodiment, certain idioms of logic and math instructions are excluded from the list. For example, although "XOR" (exclusive or) may often be a logical operation or computation of interest, the idiom "xor reg1, reg1" used in x86 computer architecture to set the register "reg1" to zero is a common instruction and is of no interest. Likewise, the features database 330 can include a list of function calls that occur infrequently in goodware. Other embodiments store data describing additional and/or different features.

The malware signature database 350 stores a set of malware signatures used to detect malware. As previously mentioned, a signature is any characteristic such as a pattern, metadata or sequence associated with an entity that can be used to accurately identify that the entity is malware. In the embodiments discussed herein, the malware signatures contain sequences derived from known malware entities.

The malware signature module 360 generates malware signatures for the known malware entities in the malware database 320. In one embodiment, the malware signature module 360 generates multiple candidate malware signatures for a given malware entity. The malware signature module 360 scores the candidate malware signatures based on the signatures' "interestingness." Then, the malware signature module 360 selects from among the candidate malware signatures based on the scores to select one or more malware signatures that are used to detect the malware entity. In one embodiment, the malware signature module 360 also deploys the selected malware signatures for the malware entities to the clients 150. This deployment can occur, for example, when updates are made to the set of malware signatures, when the malware signature module 360 generates and stores a new malware signature in the malware signature database 350, or when requested by a client 150.

Figure 4:
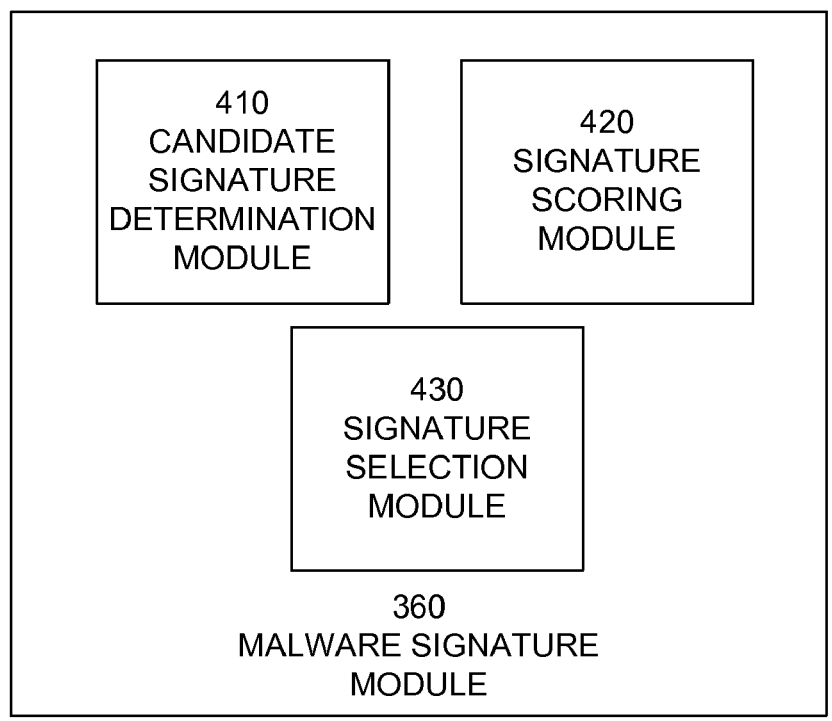
FIG. 4 is a high-level block diagram illustrating a detailed view of a malware signature module according to one embodiment.
Figure 5:
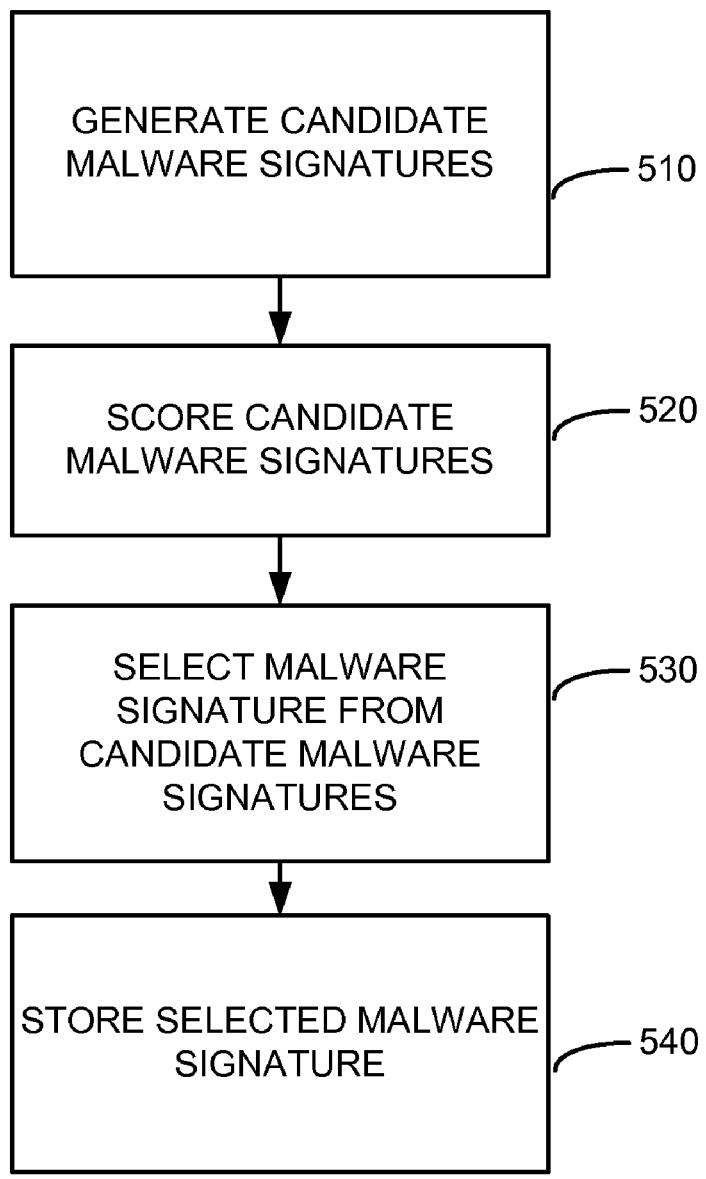
FIG. 5 is a flowchart illustrating steps performed by the security server to determine a malware signature for malicious software according to one embodiment.

FIG. 4 is a high-level block diagram illustrating a detailed view of the malware signature module 360 according to one embodiment. As shown in FIG. 4, the malware signature module 360 includes multiple modules. Those of skill in the art will recognize that other embodiments of the malware signature module 360 can have different and/or other modules than the ones described here, and that the functionalities can be distributed among the modules in a different manner.

A candidate signature determination (CSD) module 410 generates candidate malware signatures for the malware entities in the malware database 320. In one embodiment, the CSD module 410 uses a disassembler to disassemble an executable file of a malware entity in order to generate a sequence of assembly language instructions. The CSD module 410 generates candidate malware signatures formed of subsequences of the sequence. In one embodiment, the CSD module 410 processes the sequence of assembly language instructions using a sliding window of fixed length to generate (e.g., produce) a set of subsequences representing the candidate malware signatures. According to one embodiment, the length of the sliding window is large enough to fit multiple assembly language instructions, such as 48 bytes. The candidate malware signatures can be stored in the malware database 320 or the malware signature database 350, depending upon the embodiment.

The signature scoring module 420 scores the candidate malware signatures determined by the CSD module 410. In one embodiment, the signature scoring module 420 operates on a set of candidate malware signatures for a given malware entity in order to allow for selection of a malware signature based on the scores for the set of candidate malware signatures. For clarity, this description describes the scoring process with respect to a single candidate malware signature, and it will be understood that the process can be applied across a set of candidate malware signatures.

Generally, the signature scoring module 420 examines features of a candidate malware signature and assigns points to the signature based on the presence of certain features it. The signature scoring module 420 sums the points to produce a score for the candidate malware signature. In one embodiment, points are assigned for features that are "interesting" in the sense that the features are unlikely to occur in the goodware dataset. Thus, the score for the candidate malware signature represents the signature's overall "interestingness" and also indicates the likelihood that the features of the candidate malware signature will not be found in the goodware dataset. In one embodiment, the signature scoring module 420 assigns points based on features including whether the candidate malware signature contains unusual immediate operands, whether the instructions within the candidate malware signature make local function calls, whether the candidate malware signature includes logic and math instructions, and whether the candidate malware signature includes any unusual address offsets in instructions performing [base+offset] addressing.

The signature scoring module 420 analyzes the instructions within the candidate malware signature to identify instructions using immediate operands. For each immediate operand found, the signature scoring module 420 accesses the data stored in the features database 330 describing the relative frequency of immediate operand values to determine whether the operand found in the instruction within the candidate malware signature occurs at a low frequency. In one embodiment, the signature scoring module 420 assigns the candidate malware signature a point for each infrequently occurring immediate operand value found within the candidate signature.

The signature scoring module 420 also analyzes the instructions within the candidate malware signature to determine whether the instructions make local function calls. Local function calls tend to be calls to functions that were written specifically for the malware entity and implement core functionality of the malware entity. Local function calls are contrasted with system function calls, which tend to be calls to library functions and other code not specific to the malware entity. Thus, a local function call is an indicator of "interestingness" because the called local functions are unlikely to be found in the goodware dataset. In one embodiment, the signature scoring module 420 assigns the candidate malware signature a point for each local function call occurring therein. In one embodiment, the signature scoring module 420 may also assign a point for instructions associated with local function calls such as instructions used to marshal arguments on a stack for local function calls or for instructions used to analyze return values from the local functions calls.

The signature scoring module 420 further analyzes the instructions within the candidate malware signature to determine whether the candidate malware signature includes math and logic instructions. In one embodiment, a list of such math and logic instructions is stored in the features database 330. For each math and logic instruction in the candidate malware signature, the signature scoring module 420 determines whether the instruction appears in the stored list. If the math and logic instruction is in the list, the candidate malware signature receives a point. Math and logic instructions are "interesting" because they typically represent the portions of the code that are performing the work of the malware entity (as opposed, e.g., to performing standard housekeeping functions). Therefore, a sequence of math and logic instructions is intrinsically unlikely to appear in the goodware dataset and can be considered "interesting."

Additionally, the signature scoring module 420 analyzes the instructions within the candidate malware signature to determine whether it contains any unusual address offsets in [base+offset] addressing. For each instance of such addressing performed by the instructions in the candidate malware signature, the signature scoring module 420 accesses the data in the features database 330 to determine whether the offset value is considered "large." The candidate malware signature receives a point for each instance of the addressing that includes a large offset.

In one embodiment, the signature scoring module 420 applies different weights to the various features of a candidate malware signature in order to increase or decrease the weights of certain features. In other words, rather than a candidate signature receiving only a point for each instance of an unusual immediate operand, a local function call, a logic and math instruction, or an unusual address offset, the signature scoring module 420 can apply different points based on the feature that is present in the candidate signature. For example, the signature scoring module 420 can apply two points to the score for each local function call found within the candidate malware signature, thereby weighting local function calls more than the other features. Similar to the weighting for local function calls, the signature scoring module 420 can apply two points for each math and logic instruction within the candidate malware signature. In one embodiment, infrequent immediate operands and any unusual address offsets in [base+offset] addressing are weighted less than local function calls and math and logic functions. In this embodiment, the signature scoring module 420 applies only a point to each occurrence of an infrequent immediate operand and a point to each occurrence of an infrequent unusual address offset in the candidate malware signature.

The signature selection module 430 selects malware signatures that are used to detect malware entities stored in the malware database 320. In one embodiment, the signature selection module 430 selects one or more malware signatures for deployment to clients 150 that are used to detect a given malware entity. The selected malware signature for a given malware represents a signature for the malware that is least likely to generate a false-positive detection in goodware.

In one embodiment, the signature selection module 430 selects a malware signature from among a set of candidate signatures based on the scores associated with the set. In one embodiment, the highest-scoring candidate malware signature for a piece of malware is selected for use and deployment to clients 150 because it represents the malware signature that is least likely to generate a false-positive detection. Alternatively, the signature selection module 430 applies a score threshold to determine one or more malware signatures for a given malware. The threshold is used to remove candidate malware signatures which are too generic. Generic candidate signatures receive fewer points due to the lack of "interesting" features. In one embodiment, the highest-scoring candidate malware signature from among the candidate malware signatures scoring above the threshold is selected as the malware signature for the piece of malware. The signature selection module 430 stores the selected signature for the given malware in the malware signature database 350.

FIG. 6 is a flowchart illustrating steps performed by the security server 110 to generate a malware signature for malware. Other embodiments perform the illustrated steps in different orders, and/or perform different or additional steps. Moreover, some of the steps can be performed by modules or modules other than the security server 110.

In one embodiment, the security server 110 generates 510 a set of candidate malware signatures for a given malware. The security server 110 scores 520 the candidate malware signatures in the set based on the presence of features within the candidate malware signatures which are unlikely to be found in goodware. The security server 110 selects 530 a malware signature from among the candidate malware signatures based on the scores associated with the candidate malware signatures. Once the malware signature is selected, the security server 110 stores 540 the selected malware signature in the malware signature database 350 from where it can be deployed to clients 150.

The above description is included to illustrate to a security server 110 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed:

1. A computer-implemented method for selecting a signature for a malware entity, the method comprising:
using a computer to perform steps comprising:
generating a set of candidate signatures for the malware entity;
identifying, for each candidate signature, a set of features for computer program instructions contained within the candidate signature, the set of features comprising an immediate operand value used by the computer program instructions;
determining, for each candidate signature, whether the features in the set of features are likely to appear in a set of non-malicious software, the determination comprising determining a frequency at which the immediate operand value appears in the set of non-malicious software;
generating, for each candidate signature, a score for the candidate signature responsive to whether the features of the computer program instructions are likely to appear in the set of non-malicious software;
selecting a malware signature for the malware entity from among the candidate signatures in the set based on the scores; and
storing the selected malware signature.

2. The computer-implemented method of claim 1, wherein generating a set of candidate signatures comprises:
producing a sequence of computer program instructions that represents the malware entity; and
forming the set of candidate signatures from subsequences of the produced sequence.

3. The computer-implemented method of claim 1, wherein the set of features for the computer program instructions contained within the candidate signature further comprises a local function call made by the computer program instructions contained within the candidate signature.

4. The computer-implemented method of claim 1, wherein the set of features for the computer program instructions further comprises a logic and mathematical instruction appearing in the computer program instructions contained within the candidate signature.

5. The computer-implemented method of claim 1, wherein the set of features of the computer program instructions further comprises an address offset used in [base+offset] addressing by the computer program instructions contained within the candidate signature and the method further comprising:
determining whether the address offset exceeds a threshold, the threshold determined responsive to address offsets used by computer program instructions in the set of non-malicious software.

6. The computer-implemented method of claim 1, wherein generating, for each candidate signature, the score comprises:
weighting different features in the set of features with different weights; and
wherein the score for each candidate signature is based on the different weighted features in the set of features.

7. The computer-implemented method of claim 1, wherein selecting a malware signature comprises:
comparing the scores for the candidate signatures in the set to a threshold; and
selecting a candidate signature with a score above the threshold as the malware signature.

8. The computer-implemented method of claim 1, wherein selecting a malware signature comprises selecting a candidate signature with a highest score as the malware signature.

9. A computer program product comprising a non-transitory computer-readable storage medium storing computer-executable code for selecting a signature for a malware entity, the code comprising:
a candidate signature determination module configured to generate a set of candidate signatures for the malware entity;
a signature scoring module configured to:
identify, for each candidate signature, a set of features for computer program instructions contained within the candidate signature, the set of features comprising an immediate operand value used by the computer program instructions;
determine, for each candidate signature, whether the features in the set of features are likely to appear in a set of non-malicious software, the determination comprising determining a frequency at which the immediate operand value appears in the set of non-malicious software;
generate, for each candidate signature, a score for the candidate signature responsive to whether the features of the computer program instructions are likely to appear in the set of non-malicious software; and
a signature selection module configured to select a malware signature for the malware entity from among the candidate signatures in the set based on the scores and store the selected malware signature.

10. The computer program product of claim 9, wherein the candidate signature determination module is further configured to:

produce a sequence of computer program instructions that represents the malware entity; and form the set of candidate signatures from subsequences of the produced sequence.

11. The computer program product of claim 9, wherein the signature scoring module is further configured to:

weight different features in the set of features with different weights; and wherein the score for each candidate signature is based on the different weighted features in the set of features.

12. The computer program product of claim 9, wherein the signature selection module is further configured to:

compare the scores for the candidate signatures in the set to a threshold; and select a candidate signature with a score above the threshold as the malware signature.

13. The computer program product of claim 9, wherein the set of features for the computer program instructions contained within the candidate signature further comprises a local function call made by the computer program instructions contained within the candidate signature.

14. The computer program product of claim 9, wherein the set of features for the computer program instructions further comprises a logic and mathematical instruction appearing in the computer program instructions contained within the candidate signature.

15. A computer system for selecting a signature for a malware entity, the system comprising:

a computer processor; and a computer-readable storage medium storing computer program modules configured to execute on the computer processor, the computer program modules comprising:

a candidate signature determination module configured to generate a set of candidate signatures for the malware entity;

a signature scoring module configured to:

identify, for each candidate signature, a set of features for computer program instructions contained within the candidate signature, the set of features comprising an immediate operand value used by the computer program instructions;

determine, for each candidate signature, whether the features in the set of features are likely to appear in a set of non-malicious software, the determination comprising determining a frequency at which the immediate operand value appears in the set of non-malicious software;

generate, for each candidate signature, a score for the candidate signature responsive to whether the features of the computer program instructions are likely to appear in the set of non-malicious software; and a signature selection module configured to select a malware signature for the malware entity from among the candidate signatures in the set based on the scores and store the selected malware signature.

16. The computer-implemented system of claim 15, wherein the candidate signature determination module is further configured to:

produce a sequence of computer program instructions that represents the malware entity; and form the set of candidate signatures from subsequences of the produced sequence.

17. The computer-implemented system of claim 15, wherein the signature scoring module is further configured to:

weight different features in the set of features with different weights; and wherein the score for each candidate signature is based on the different weighted features in the set of features.

18. The computer-implemented system of claim 15, wherein the signature selection module is further configured to:

compare the scores for the candidate signatures in the set to a threshold; and select a candidate signature with a score above the threshold as the malware signature.

19. The computer system of claim 15, wherein the set of features for the computer program instructions contained within the candidate signature further comprises a local function call made by the computer program instructions contained within the candidate signature.

20. The computer system of claim 15, wherein the set of features for the computer program instructions further comprises a logic and mathematical instruction appearing in the computer program instructions contained within the candidate signature.

* * * * *